(12) United States Patent
Yoshihama et al.

(10) Patent No.: US 9,208,128 B2
(45) Date of Patent: Dec. 8, 2015

(54) COURSE DETERMINATION SYSTEM AND DRIVING ASSIST SYSTEM OF VEHICLE

(75) Inventors: Yuki Yoshihama, Susono (JP); Tomonori Akiyama, Susono (JP); Shinji Igarashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 13/877,511

(22) PCT Filed: Oct. 4, 2011

(86) PCT No.: PCT/IB2011/002317
§ 371 (c)(1),
(2), (4) Date: Apr. 3, 2013

(87) PCT Pub. No.: WO2012/046118
PCT Pub. Date: Apr. 12, 2012

(65) Prior Publication Data
US 2013/0218369 A1  Aug. 22, 2013

(30) Foreign Application Priority Data
Oct. 5, 2010  (JP) ................. 2010-225583

(51) Int. Cl.
*G06F 17/00* (2006.01)
*G06K 9/00* (2006.01)
*B60W 30/08* (2012.01)
(Continued)

(52) U.S. Cl.
CPC ............... *G06F 17/00* (2013.01); *B60W 30/08* (2013.01); *B60W 30/0956* (2013.01); *B60W 30/18145* (2013.01); *B60W 30/18154* (2013.01); *B60W 2520/14* (2013.01); *B60W 2540/10* (2013.01); *B60W 2540/12* (2013.01); *B60W 2550/308* (2013.01); *B60W 2550/402* (2013.01)

(58) Field of Classification Search
CPC .......... G06K 9/00791; G06K 9/00805; G06F 17/00; B60W 30/08; B60W 30/0956; B60W 30/18145; B60W 30/18154
See application file for complete search history.

(56) References Cited

U.S. PATENT DOCUMENTS

| 6,470,266 B1 | 10/2002 | Ito et al. |
| 2002/0183906 A1 | 12/2002 | Ikeda |
| 2006/0184321 A1 | 8/2006 | Kawakami et al. |

(Continued)

FOREIGN PATENT DOCUMENTS

| DE | 102005002719 A1 | 8/2006 |
| EP | 0 085 422 A1 | 1/1983 |

(Continued)

OTHER PUBLICATIONS

International Search Report issued in International Application No. PCT/IB2011/002317 dated Apr. 2, 2012.

*Primary Examiner* — Yonel Beaulieu
*Assistant Examiner* — Basil T Jos
(74) *Attorney, Agent, or Firm* — Oliff PLC (57) ABSTRACT

A course determining system of a vehicle determines, when two or more objects that are present around the vehicle are detected, whether a passable road which the vehicle can enter is present between the two or more objects, recognizes the two or more objects as a single object when it is determined that there is no passable road between the two or more objects, and determines a running course based on at least one road including the passable road when it is determined that the passable road is present between the objects.

10 Claims, 6 Drawing Sheets

(51) Int. Cl.
  *B60W 30/095*  (2012.01)
  *B60W 30/18*  (2012.01)

(56) References Cited

U.S. PATENT DOCUMENTS

2010/0098295 A1* 4/2010 Zhang et al. ............... 382/103
2011/0222732 A1   9/2011 Higuchi et al.

FOREIGN PATENT DOCUMENTS

| EP | 1 503 354 A1 | 2/2005 |
|---|---|---|
| EP | 1684142 A1 * | 7/2006 |
| EP | 1 684 142 B1 | 10/2009 |
| JP | A-07-057182 | 3/1995 |
| JP | A-09-128687 | 5/1997 |
| JP | A-2000-266553 | 9/2000 |
| JP | A-2001-109999 | 4/2001 |
| JP | A-2002-352397 | 12/2002 |
| JP | A-2003-030792 | 1/2003 |
| JP | A-2004-114907 | 4/2004 |
| JP | A-2005-138623 | 6/2005 |
| JP | A-2005-326963 | 11/2005 |
| JP | A-2008-030541 | 2/2008 |
| JP | A-2009-075047 | 4/2009 |
| JP | A-2010-072973 | 4/2010 |
| JP | A-2010-079424 | 4/2010 |
| WO | WO 2007/029089 | 3/2007 |

* cited by examiner

COURSE DETERMINATION SYSTEM AND DRIVING ASSIST SYSTEM OF VEHICLE

BACKGROUND OF THE INVENTION

1. Field of the Invention

The invention relates to a course determination system installed on a vehicle, such as an automobile, and also relates to a driving assist system.

2. Description of Related Art

As an example of the related art, a system that determines a running course as a path along which the vehicle is able to run, and informs the driver of deviation of the vehicle from the determined course, or assists the driver in a driving operation for avoiding deviation from the course has been proposed. In a known method of determining the course along which the vehicle can run, a road marker or markers (such as a white line) as an indicator(s) indicative of a lane boundary or boundaries or an object or objects is/are detected, and the course is determined based on the result of the detection. Further, a grouping operation performed when two or more objects are detected has been proposed in which the two or more objects are recognized as a single object if the distance between the objects is equal to or smaller than a predetermined value (see, for example, Japanese Patent Application Publication No. 2003-030792 (JP-A-2003-030792)).

In the related art, it is not considered whether a pathway on which the vehicle can run is present between the two or more objects; therefore, when the driver attempts to cause the vehicle to enter the pathway, the driver may be informed of deviation of the vehicle from the current course, or an operation to assist the driver in a driving operation for returning the vehicle to the current course may be performed.

SUMMARY OF THE INVENTION

The invention provides a technology for making a course determination suitable for the actual road conditions, in a system that determines a running course of a vehicle based on an object(s) present around the vehicle, and a driving assist system that controls a vehicle driving assisting process based on an object(s) present around the vehicle.

A course determination system for determining a running course as a path along which the vehicle can run according to a first aspect of the invention determines, when a plurality of objects are detected, whether a road on which the vehicle can run is present between these objects, and determines the course according to the result of the determination.

More specifically, the course determination system of the vehicle according to the first aspect of the invention includes detecting means for detecting an object that is present around the vehicle, determining means for determining, when a plurality of objects are detected by the detecting means, whether a passable road which the vehicle can enter is present between the plurality of objects, and course determining means for determining the running course based on at least one road including the passable road between the objects, when the determining means determines that the passable road is present between the objects.

When a vehicle passable road which the vehicle can enter is present between two or more objects, the course determination system according to the first aspect of the invention determines the course based on at least one road including the above-indicated passable road. Accordingly, when the course determined by the course determining means is used by a driving assist system, the system does not execute a driving assisting process in response to the motion of the vehicle that enters the road between the objects. As a result, the driver will not be bothered by otherwise possible execution of the driving assisting process. The "driving assisting process" mentioned herein may be, for example, a process of informing the driver of the presence of an object as an obstacle or deviation of the vehicle from the course, or a process of assisting the driver in a driving operation for preventing the vehicle from colliding with or approaching an object as an obstacle, or a driving operation for preventing the vehicle from deviating from the determined course.

In the course determination system according to the first aspect of the invention, the course determining means may determine the running course while regarding (or grouping) the above-indicated plurality of objects as a single object, when the determining means determines that there is no passable road between the objects. In this case, since a region between the plurality of objects is regarded as a region that deviates from the course, a driving assisting process is executed or carried out in response to the motion of the vehicle that is going to enter the region between the objects.

In the course determination system according to the first aspect of the invention, the determining means may determine that the passable road is present between the plurality of objects, when the distance between the objects is larger than the width of a road through which the vehicle can pass. The "width of the road" mentioned herein may be obtained by adding a given margin to the width of the self vehicle, or adding a given margin to the maximum value of statistically obtained vehicle widths, or adding a given margin to twice the maximum value of the statistically obtained vehicle widths, for example.

In the course determination system according to the first aspect of the invention, the determining means may determine that the passable road is present between the plurality of objects, when a road located between the objects is registered in map information of a navigation system.

In the course determination system according to the first aspect of the invention, the determining means may specify a trace of another vehicle, and determine that the passable road is present between the plurality of objects when the specified trace extends through between the plurality of objects.

It is desirable that "the roads which the vehicle can enter" in the first aspect of the invention do not include roads which the vehicle is inhibited from entering. For example, it is desirable to exclude one-way streets through which the self vehicle is inhibited from passing in its traveling direction, and vehicle-free roads through which automobiles are inhibited from passing, from "the roads which the vehicle can enter". Thus, in the course determination system according to the first aspect of the invention, the determining means may determine, when a road is present between the plurality of objects detected by the detecting means, that there is no passable road between the objects if the road is a no-entry road which the vehicle is inhibited from entering.

With the above arrangement, the driving assisting process is executed, in response to the motion of the vehicle that is going to enter a vehicle-free or no-entry road between two or more objects. As a method of determining whether the road located between the two or more objects is a vehicle-free or no-entry road which the vehicle is inhibited from entering, it may be determined whether there is a road sign indicative of no-entry of vehicles, based on an image or picture captured by a camera, or the like, or it may be determined whether data indicative of no-entry of vehicles are registered in map information of a navigation system, for example.

The invention may also be applied to a vehicle driving assist system. The driving assist system according to a second aspect of the invention executes a driving assisting process in response to the motion of the vehicle that is going to pass through between two or more objects when there is no road between the two or more objects, and restricts execution of the driving assisting process responsive to the motion of the vehicle that is going to pass through between two or more objects, when there is a road between the two or more objects.

More specifically, the vehicle driving assist system according to the second aspect of the invention includes detecting means for detecting an object that is present around the vehicle, determining means for determining, when a plurality of objects are detected by the detecting means, whether a passable road which the vehicle can enter is present between the plurality of objects, and control means for executing a driving assisting process in response to the motion of the vehicle that is going to pass through between the plurality of objects when the determining means determines that there is no passable road between the objects, and restricts execution of the driving assisting process responsive to the motion of the vehicle that is going to pass through between the plurality of objects when the determining means determines that the passable road is present between the objects.

According to the above aspects of the invention, it is possible to make a course determination suitable for the actual road conditions, in the system for determining the course of the vehicle based on an object(s) present around the vehicle, and in the driving assist system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described with reference to the drawings. In the embodiment as described below, the invention is applied to a driving assist system that determines a running course of the vehicle and an obstacle, and performs a driving assisting process for preventing the vehicle from deviating from the determined course or colliding with or approaching the obstacle. The "driving assisting process" mentioned herein is carried out at the time when the vehicle is able to circumvent or avoid an object as an obstacle, and is carried out at an earlier time than a collision damage alleviating process carried out when a collision between the vehicle and the obstacle cannot be avoided. It is to be understood that the configuration of the system which will be described below illustrates one embodiment of the invention, and the invention is not limited to the configuration as described below.

Figure 1:
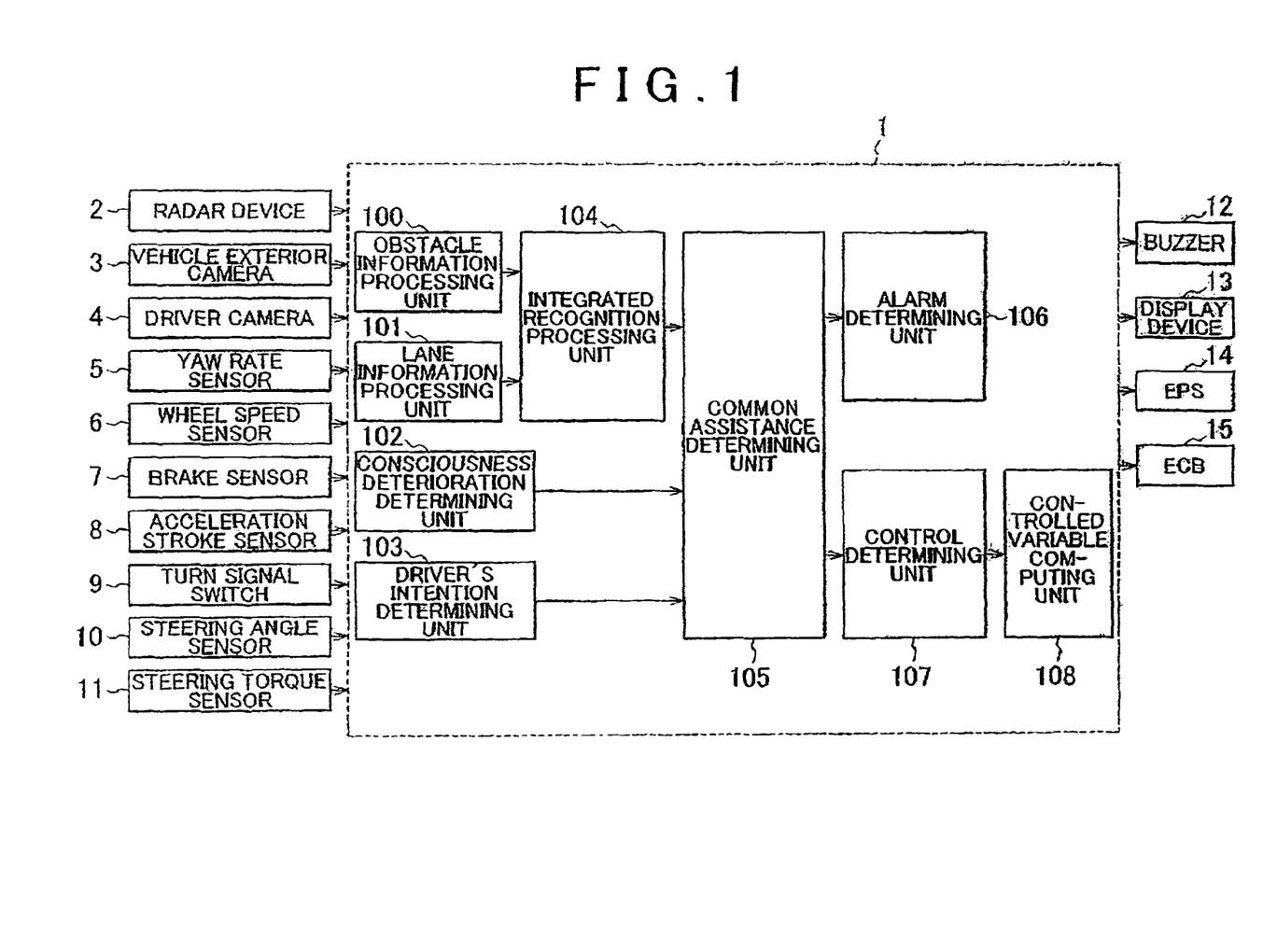
FIG. 1 is a block diagram illustrating the configuration (functional units) of a vehicle driving assist system to which one embodiment of the invention is applied.

FIG. 1 is a block diagram illustrating the configuration (functional units) of a vehicle driving assist system to which the invention is applied. As shown in FIG. 1, a control unit (ECU) 1 for driving assist is installed on the vehicle.

The ECU 1 is an electronic control unit including CPU, ROM, RAM, backup RAM, and an I/O interface. Various sensors, such as a radar device 2, vehicle exterior camera 3 for photographing the exterior or outside of the vehicle, driver camera 4 for photographing the driver, yaw rate sensor 5, wheel speed sensor 6, brake sensor 7, acceleration stroke sensor 8, turn signal switch 9, steering angle sensor 10, and a steering torque sensor 11, are electrically connected to the ECU 1, and the ECU 1 receives output signals of these sensors.

The radar device 2 is mounted on the front side of the vehicle, for example, and is operable to transmit millimeter waves to the front of the vehicle and receive radio waves (reflected waves) reflected by an object located outside the vehicle, thereby to generate information (for example, a relative distance or a relative angle) concerning the position of the object relative to the vehicle. The vehicle exterior camera 3 is placed within the vehicle compartment at a position where the camera can capture the front of the vehicle in the field of view, for example, and generates an image of the front of the vehicle. The driver camera 4 is placed within the vehicle compartment at a position where the camera can capture the driver in the field of view, for example, and generates an image of the driver. The yaw rate sensor 5 is mounted on the vehicle body, and generates an electric signal correlated with the yaw rate of the vehicle. The wheel speed sensor 6 is mounted on a wheel of the vehicle, and generates an electric signal correlated with the running speed (vehicle speed) of the vehicle.

For example, the brake sensor 7 is mounted on a brake pedal within the vehicle compartment, and generates an electric signal correlated with the operation torque (pedal pressure) applied to the brake pedal. The acceleration stroke sensor 8 is mounted on an accelerator pedal within the vehicle department, and generates an electric signal correlated with the operation torque (pedal pressure) applied to the accelerator pedal. The turn signal switch 9 is mounted on a turn signal lever within the vehicle compartment, and generates an electric signal correlated with a direction indicated by a turn signal (a direction indicator) when the turn signal lever is operated. The steering angle sensor 10 is mounted on a steering rod connected to a steering wheel within the vehicle compartment, and generates an electric signal correlated with the angle of rotation of the steering wheel as measured from the neutral position. The steering torque sensor 11 is mounted on the steering rod, and generates an electric signal correlated with the torque (steering torque) applied to the steering wheel.

Also, various devices and systems, such as a buzzer 12, display device 13, electric power steering (EPS) system 14, and an electronically controlled brake (ECB) system 15, are connected to the ECU 1, and these devices and systems are electrically controlled by the ECU 1.

For example, the buzzer 12 is mounted in the vehicle compartment, and is operable to generate an alarm or warning tone. The displace device 13 is mounted in the vehicle compartment, and is operable to display various messages and/or warning lamps. The electric power steering (EPS) system 14 is operable to assist the driver in operating the steering wheel, using torque generated by an electric motor. The electronically controlled brake (ECB) system 15 is operable to electrically adjust the hydraulic pressure (brake oil pressure) of a friction brake provided on each wheel.

The ECU 1 has the functions as described below, so as to control various devices and systems, using the output signals of the above-indicated various sensors. Namely, the ECU 1 includes an obstacle information processing unit 100, a lane information processing unit 101, a consciousness deterioration determining unit 102, a driver's intention determining unit 103, an integrated recognition processing unit 104, a common assist determining unit 105, an alarm determining unit 106, a control determining unit 107, and a controlled variable computing unit 108.

The obstacle information processing unit 100 computes coordinates representing the position of an object, in a coordinate system in which the self vehicle lies on the origin, based on information generated from the radar device 2. The obstacle information processing unit 100 creates obstacle information including the coordinates of the position of the object and the yaw angle of the self vehicle relative to the object. The obstacle information processing unit 100 may create obstacle information, based on an image or picture captured by the vehicle exterior camera 3.

The lane information processing unit 101 creates lane information including information concerning a lane and information concerning the orientation of the vehicle relative to a lane boundary or boundaries, based on an image or picture captured by the vehicle exterior camera 3. The information concerning the lane includes, for example, information concerning indicators indicative of lane boundaries (for example, road markers, such as white lines and yellow lines, indicative of lane boundaries, and three-dimensional objects, such as curbs, guardrails, gutters or ditches, walls, and poles, which extend alongside the lane), and information concerning the width of the lane. The information concerning the orientation of the vehicle relative to the lane boundaries includes, for example, information concerning distances between the indicators indicative of the lane boundaries and the vehicle, information concerning the offset amount of the vehicle position relative to the center of the lane, and information concerning the yaw angle of the vehicle travelling direction relative to the indicators indicative of the lane boundaries. When a navigation system is installed on the vehicle, the lane information processing unit 101 may create information concerning the running course, from map information and GPS information possessed by the navigation system.

The consciousness deterioration determining unit 102 determines the degree of deterioration of consciousness (wakefulness) of the driver, based on an image or picture captured by the driver camera 4. For example, the consciousness deterioration determining unit 102 computes the eye closure time or eye closure frequency of the driver, from an image or picture captured by the driver camera 4, and determines that the consciousness of the driver is deteriorated (the degree of deterioration of consciousness is high, or the wakefulness is low) when the eye closure time or eye closure frequency exceeds the upper limit. Also, the consciousness deterioration determining unit 102 may compute a length of time for which the orientation of the driver's face or the direction of the line of sight deviates from the vehicle travelling direction, from an image or picture captured by the driver camera 4, and may determine that the driver is not looking at the road when the calculated time exceeds the upper limit.

The driver's intention determining unit 103 determines whether changes in the operation amount of the brake pedal, changes in the operation amount of the accelerator pedal, or changes in the operation amount (steering amount) of the steering wheel occur due to the intention of the driver, based on the output signals of the wheel speed sensor 6, brake sensor 7, acceleration stroke sensor 8, turn signal switch 9, steering angle sensor 10, and the steering torque sensor 11.

The integrated recognition processing unit 104 specifies a region (running course) on which the vehicle is able to run, based on the obstacle information created by the obstacle information processing unit 100 and the lane information created by the lane information processing unit 101, and determines the yaw angle of the vehicle relative to a course boundary, and the offset amount of the vehicle relative to the center of the course. The integrated recognition processing unit 104 enlarges the size, of the object specified by the obstacle information, and specifies the course based on information concerning the size and position of the object that has been enlarged, and the lane information, or determines whether the object thus enlarged can be an obstacle to the vehicle. When there are two or more objects specified by the obstacle information, the integrated recognition processing unit 104 regards (groups) these objects as a single object, and determines a running course to be taken by the vehicle. A method of determining the course when there are two or more objects specified by the obstacle information will be described later.

On a road having a small lane width, the driver may have no other choice but to let the vehicle deviate from the lane. With regard to a road having a small lane width, therefore, the integrated recognition processing unit 104 may set a running course of the vehicle, based on indicators, such as road markers (e.g., white lines and yellow lines) indicative of lane boundaries, and three-dimensional objects (e.g., curbs, guardrails, gutters, walls, and poles) that extend alongside the lane. For example, when road markers are present on both sides of the lane, the integrated recognition processing unit 104 may set a running course that is wider than the original lane, with reference to the center of the lane (Intermediate between the road markers located on both sides of the lane). Also, when a road marker or markers is/are present on only one side of the lane, the integrated recognition processing unit 104 may set a reference position outside the road marker(s), and set a range of a given width as measured from the reference position, as a running course. However, if an object exists in the course thus enlarged, it is desirable to restrict enlarging setting of the running course.

The common assist determining unit 105 determines whether execution of a driving assisting process is to be restricted, based on the information created by the integrated recognition processing unit 104, the result of determination made by the consciousness deterioration determining unit 102, and the result of determination made by the driver's intention determining unit 103. For example, if the consciousness deterioration determining unit 102 determines that the consciousness of the driver is deteriorated or lowered (the degree of deterioration of consciousness is high, or the wakefulness is low), or determines that the driver is not looking at the road, the common assist determining unit 105 permits the driving assisting process to be executed. If, on the other hand, the driver's intention determining unit 103 determines that the driver performs an intentional operation, the common assist determining unit 105 restricts execution of the driving assisting process.

When the common assist determining unit 105 permits execution of the driving assisting process, the alarm determining unit 106 determines the timing of sounding of the buzzer 12 or the timing of display of a warning message or warning lamp on the display device 13. For example, when the distance between the vehicle and a course boundary as measured in the vehicle width direction becomes equal to or smaller than a predetermined distance, the alarm determining unit 106 causes the buzzer 12 to sound an alert, or causes the display device 13 to display a warning message or warning lamp thereon.

Also, the alarm determining unit 106 may cause the buzzer 12 to sound an alert, or cause the display device 13 to display a warning message or warning lamp, when the time it takes the vehicle to reach a course boundary becomes equal to or shorter than a predetermined time. In the case where the course has a small width, the alarm determining unit 106 may cause the buzzer 12 to sound an alert, or cause the display device 13 to display a warning message or warning lamp, when the distance between the vehicle and a three-dimensional object (such as a curb, guardrail, gutter, wall, or a pole that is present alongside the course) as measured in the vehicle width direction becomes equal to or smaller than a predetermined distance. In the case where the vehicle enters a curve, or is running along a curve, the alarm determining unit 106 may cause the buzzer 12 to sound an alert, or cause the display device 13 to display a warning message or warning lamp, when the distance between the vehicle and a course boundary as measured in the vehicle travelling direction becomes equal to or smaller than a predetermined distance. Also, in the case where the vehicle enters a curve, or is running along a curve, the alarm determining unit 106 may cause the buzzer 12 to sound an alert, or cause the display device 13 to display a warning message or warning lamp, when the time it takes the vehicle to reach a course boundary becomes equal to or shorter than a predetermined time.

In this connection, the above-mentioned predetermined distance or predetermined time may be changed in accordance with the output signal (vehicle speed) of the wheel speed sensor 6 and/or the output signal (yaw rate) of the yaw rate sensor 5. For example, as the vehicle speed is higher, the predetermined distance may be set to a longer distance, or the predetermined time may be set to a longer time. Also, as the yaw rate is larger, the predetermined distance may be set to a longer distance, or the predetermined time may be set to a longer time.

The manner of giving a warning to the driver is not limited to sounding of the buzzer 12 and display of a warning message or warning lamp on the display device 13, but another method, such as intermittently changing the torque for fastening the seat belt, may be employed.

When the common assist determining unit 105 permits the driving assisting process to be executed, the control determining unit 107 determines the time at which the electric power steering (EPS) system 14 and/or electronically controlled brake (ECB) system 15 is/are actuated so as to prevent the vehicle from deviating from the course or colliding with an obstacle. For example, the control determining unit 107 may actuate the electric power steering (EPS) system 14 and/or electronically controlled brake (ECB) system 15 when the distance between the vehicle and a course boundary or an obstacle as measured in the vehicle width direction becomes equal to or shorter than a predetermined distance.

Also, the control determining unit 107 may actuate the electric power steering (EPS) system 14 and/or electronically controlled brake (ECB) system 15, when the time it takes the vehicle to reach the course boundary or obstacle becomes equal to or shorter than a predetermined time. When the course has a small width, the control determining unit 107 may actuate the electric power steering (EPS) system 14 and/or electronically controlled brake (ECB) system 15 when the distance between the vehicle and a three-dimensional object (such as a curb, guardrail, gutter, wall, or a pole, which exists alongside the course) as measured in the vehicle width direction becomes equal to or smaller than a predetermined distance.

In the case where the vehicle enters a curve or the vehicle is running along a curve, the control determining unit 107 may actuate the electric power steering (EPS) system 14 and/or electronically controlled brake (ECB) system 15 when the distance between the vehicle and a course boundary as measured in the vehicle travelling direction becomes equal to or shorter than a predetermined distance. In the case where the vehicle enters a curve or the vehicle is running along a curve, the control determining unit 107 may actuate the electric power steering (EPS) system 14 and/or electronically controlled brake (ECB) system 15 when the time it takes the vehicle to reach the course boundary becomes equal to or shorter than a predetermined time.

While the predetermined distance or predetermined time used by the control determining unit 107 is changed according to the vehicle speed and/or the yaw rate, like the predetermined distance or predetermined time used by the alarm determining unit 106, the predetermined distance or time used by the control determining unit 107 is set to be shorter than the predetermined distance or time used by the alarm determining unit 106.

When a request to actuate the electric power steering (EPS) system 14 and/or electronically controlled brake (ECB) system 15 is generated from the control determining unit 107, the controlled variable computing unit 108 computes a controlled variable(s) of the electric power steering (EPS) system 14 and/or electronically controlled brake (ECB) system 15, and actuates the electric power steering (EPS) system 14 and/or electronically controlled brake (ECB) system 15 according to the calculated controlled variable(s) and the timing determined by the control determining unit 107. For example, the controlled variable computing unit 108 computes a target yaw rate required to prevent the vehicle from deviating from the course, or a target yaw rate required to circumvent or avoid an obstacle, using the information created by the integrated recognition processing unit 104, the output signal (vehicle speed) of the wheel speed sensor 6, and the output signal (yaw rate) of the yaw rate sensor 5, as parameters. More specifically, the controlled variable computing unit 108 computes a target yaw rate Ytrg according to the following equation, where D denotes the relative distance between a course boundary or obstacle and the vehicle, T denotes a length of time it takes the vehicle to reach the course boundary or obstacle, and θ denotes the yaw angle of the vehicle relative to the course boundary or obstacle.

$$Ytrg = (\theta \cdot V \cdot \sin \theta)/D$$

The controlled variable computing unit 108 determines the controlled variable (steering torque) of the electric power steering (EPS) system 14 and the controlled variable (brake oil pressure) of the electronically controlled brake (ECB) system 15, using the target yaw rate Ytrg as a parameter. At this time, the relationship between the target yaw rate Ytrg and the steering torque, and the relationship between the target yaw rate Ytrg and the brake oil pressure may be defined in the form of maps in advance. When the target yaw rate Ytrg is smaller than a predetermined value (the maximum value of the yaw rate with which deviation from the course and contact or collision with the obstacle can be avoided only by a steering action), the brake oil pressure of the electronically controlled brake (ECB) system 15 may be set to zero. If different brake oil pressures are applied to the friction brakes of the right and left wheels of the vehicle when the electronically controlled brake (ECB) system 15 is operated, a yaw rate that interferes with the yaw rate produced by the electric power steering (EPS) system 14 may be produced. Therefore, it is desirable to apply substantially the same brake oil pressure to the friction brakes of the right and left wheels.

The method of reducing the running speed of the vehicle is not limited to actuating the friction brakes by means of the electronically controlled brake (ECB) system 15, but the running speed of the vehicle may also be reduced by converting the kinetic energy of the vehicle into electric energy (regeneration), or changing the speed ratio of the transmission so as to increase an engine brake.

The driving assist system as described above makes it possible to inform the driver of the presence of an obstacle or deviation of the vehicle from the course, and assist the driver in a driving operation to prevent the vehicle from deviating from the course or a driving operation to circumvent or avoid the obstacle.

Next, the method of determining the course when there are two or more objects specified by the obstacle information will be described. When the integrated recognition processing unit 104 receives obstacle information concerning two or more objects from the obstacle information processing unit 100, the processing unit 104 determines whether the two or more objects can be regarded (grouped) as a single object. The two or more objects mentioned herein are objects that are discontinuously located in a direction parallel to the lane, and may be, for example, guardrails, poles, roadside trees, curbs, or gutters.

Figure 2:
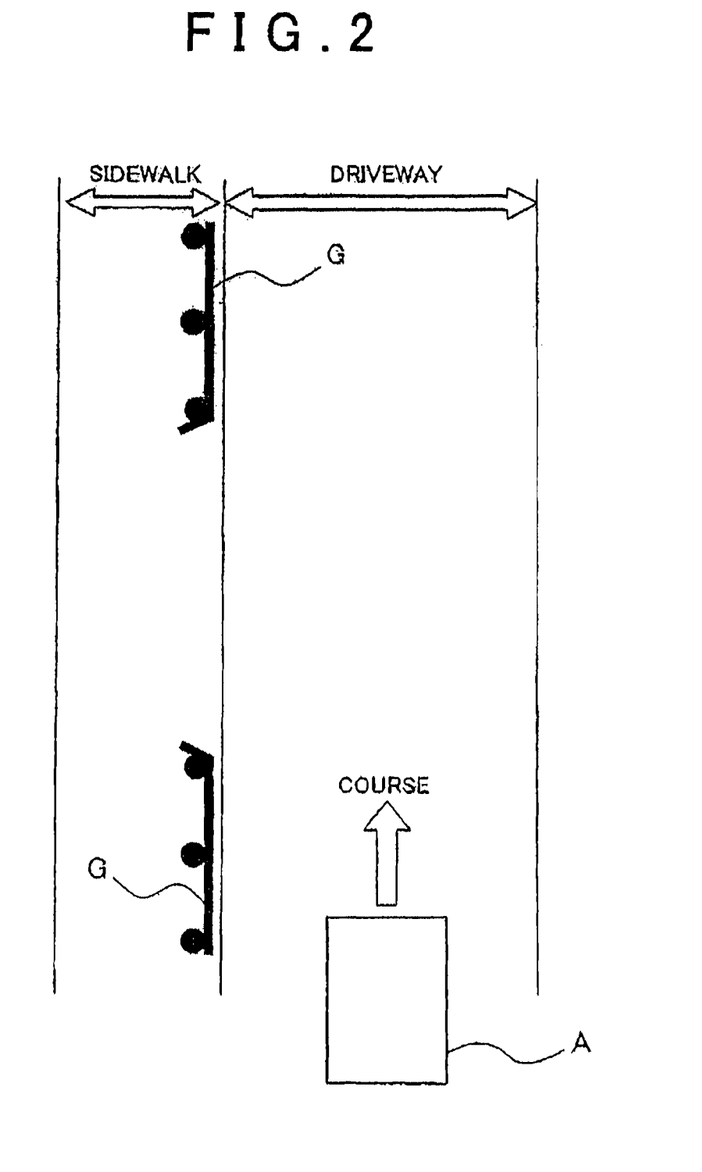
FIG. 2 is a view concerned with the embodiment of the invention, illustrating an example in which there is no road between two or more objects.

In the case where the objects are guardrails that separate a driveway or street and a sidewalk from each other, a discontinuity or break is provided between the guardrails Q as shown in FIG. 2, at a location where a bus stop is installed, for example. In this case, it is necessary to avoid a situation where the self vehicle A enters the space between the guardrails G; therefore, it is desirable to regard (group) the two guardrails G that are spaced apart from each other as a single object.

Figure 3:
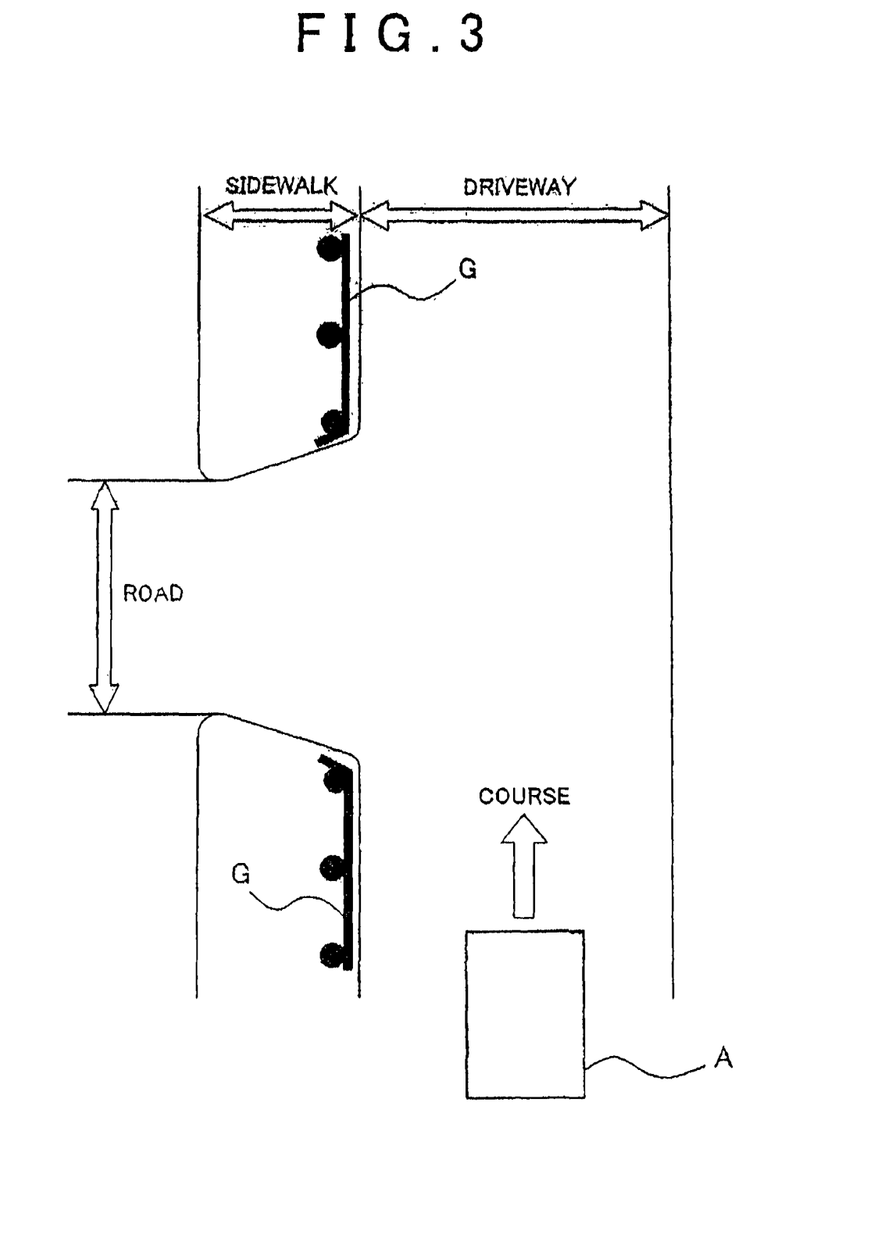
FIG. 3 is a view concerned with the embodiment of the invention, illustrating an example in which there is a road between two or more objects.

In the meantime, a discontinuity or break is also provided between guardrails G, as shown in FIG. 3, at a location where a sideway (road) through which the vehicle can pass is connected to the road on which the self vehicle A is running. If the two guardrails G that are spaced apart from each other are regarded (grouped) as a single object under the above circumstances, the sideway will be treated as a region that deviates from the running course. Therefore, when the driver attempts to cause the self vehicle A to enter the sideway (i.e., turn the self vehicle A onto the sideway), a driving assisting process may be undesirably executed, and the driver may be bothered by the driving assist. Thus, when a road is present between two or more objects, such as in the space between the guardrails G, it is desirable to determine the course without regarding the two or more objects as a single object.

Thus, when there are two or more objects specified by the obstacle information created by the obstacle information processing unit 100, the integrated recognition processing unit 104 of this embodiment determines whether a road which the vehicle can enter is present between the two or more objects, and determines the running course of the vehicle according to the result of the determination. It is desirable that "the roads which the vehicle can enter" mentioned herein do not include roads which the vehicle is inhibited from entering. For example, it is desirable to exclude one-way streets through which the self vehicle is inhibited from passing in its traveling direction, and vehicle-free roads through which automobiles are inhibited from passing, from "the roads which the vehicle can enter". Thus, even when there is a road between two or more objects, the integrated recognition processing unit 104 of this embodiment determines that there is no road between the two or more objects if the vehicle cannot enter the road.

As a method of determining whether there is a road between two or more objects, it may be determined whether the width (distance) between the two or more objects is equal to or larger than the width of a road through which the vehicle can pass (method 1), or it may be determined whether a road located between the two or more objects is registered in map information possessed by the navigation system (method 2), or it maybe determined whether the trace of another vehicle detected by the vehicle exterior camera 3 extends through between the two or more objects (method 3). The "width of a road through which the vehicle can pass" is selected from, for example, a width obtained by adding a given margin to the width of the self vehicle, a width obtained by adding a given margin to the maximum value of statistically obtained vehicle widths (for example, the widths of passenger cars), a width obtained by adding a given margin to twice the maximum value of the statistically obtained vehicle widths, and so forth.

As a method of determining whether the road located between the two or more objects is a no-entry road which the vehicle is inhibited from entering, it may be determined whether there is a road sign or indicator indicative of no-entry of vehicles, based on an image or picture captured by the vehicle exterior camera 3, or it may be determined whether data indicative of no-entry of vehicles are registered in map information of the navigation system, for example.

If it is determined by the above-described various methods that there is no road which the vehicle can enter, between the two or more objects, the integrated recognition processing unit 104 regards (groups) the two or more objects as a single object. If, on the other hand, it is determined by the above-described various methods that a road which the vehicle can enter is present between the two or more objects, the integrated recognition processing unit 104 does not regard the two or more objects as a single object, and determines the running course of the vehicle, based on roads including the road located between the two or more objects. Namely, when it is determined that a road which the vehicle can enter is present between the two or more objects, the integrated recognition processing unit 104 treats the two or more objects as individually independent objects, and determines the course while joining the road on which the vehicle is currently running with the road located between the two or more objects.

Figure 4:
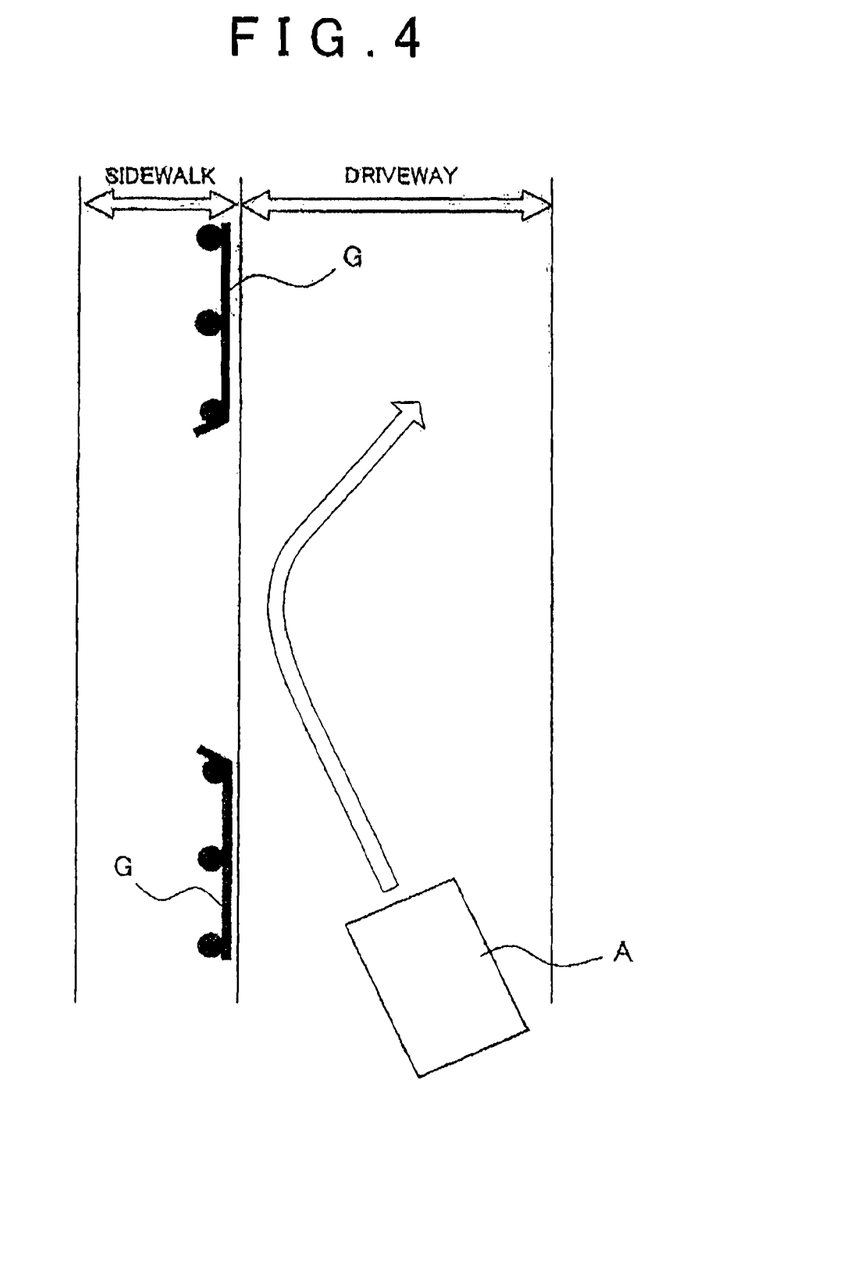
FIG. 4 is a view concerned with the embodiment of the invention, illustrating an example of a traveling trace of a vehicle, when there is no road between two or more objects, and a driving assisting process is executed.
Figure 5:
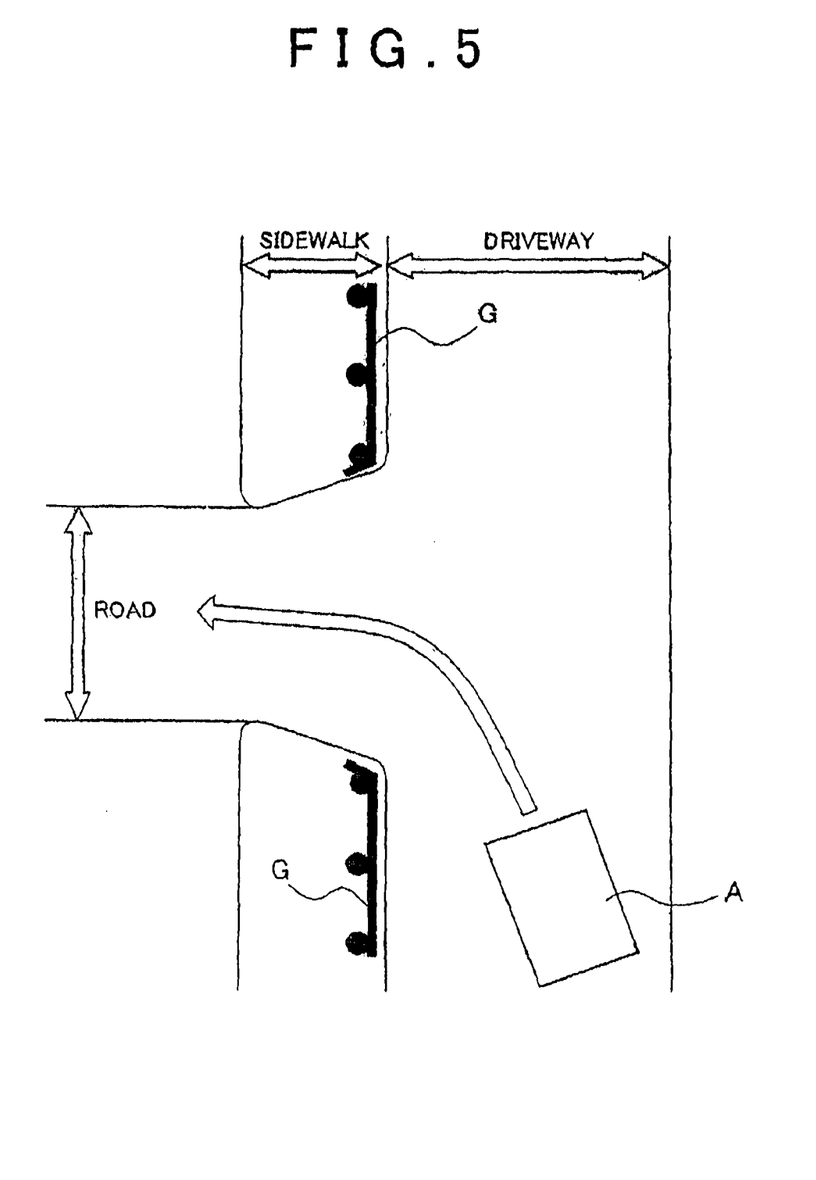
FIG. 5 is a view illustrating an example of a traveling trace of a vehicle, when there is a road between two or more objects, and a driving assisting process is not executed.

Consequently, if the vehicle is going to proceed into space between two or more objects when no road which the vehicle can enter is present between the two or more objects, as shown in FIG. 4, the driving assisting process is carried out. If, on the other hand, the vehicle is going to proceed into space between two or more objects when a road which the vehicle can enter is present between the two or more objects, as shown in FIG. 5, the driving assisting process is not carried out, and the driver will not be bothered by the otherwise possible driving assist operation.

Figure 6:
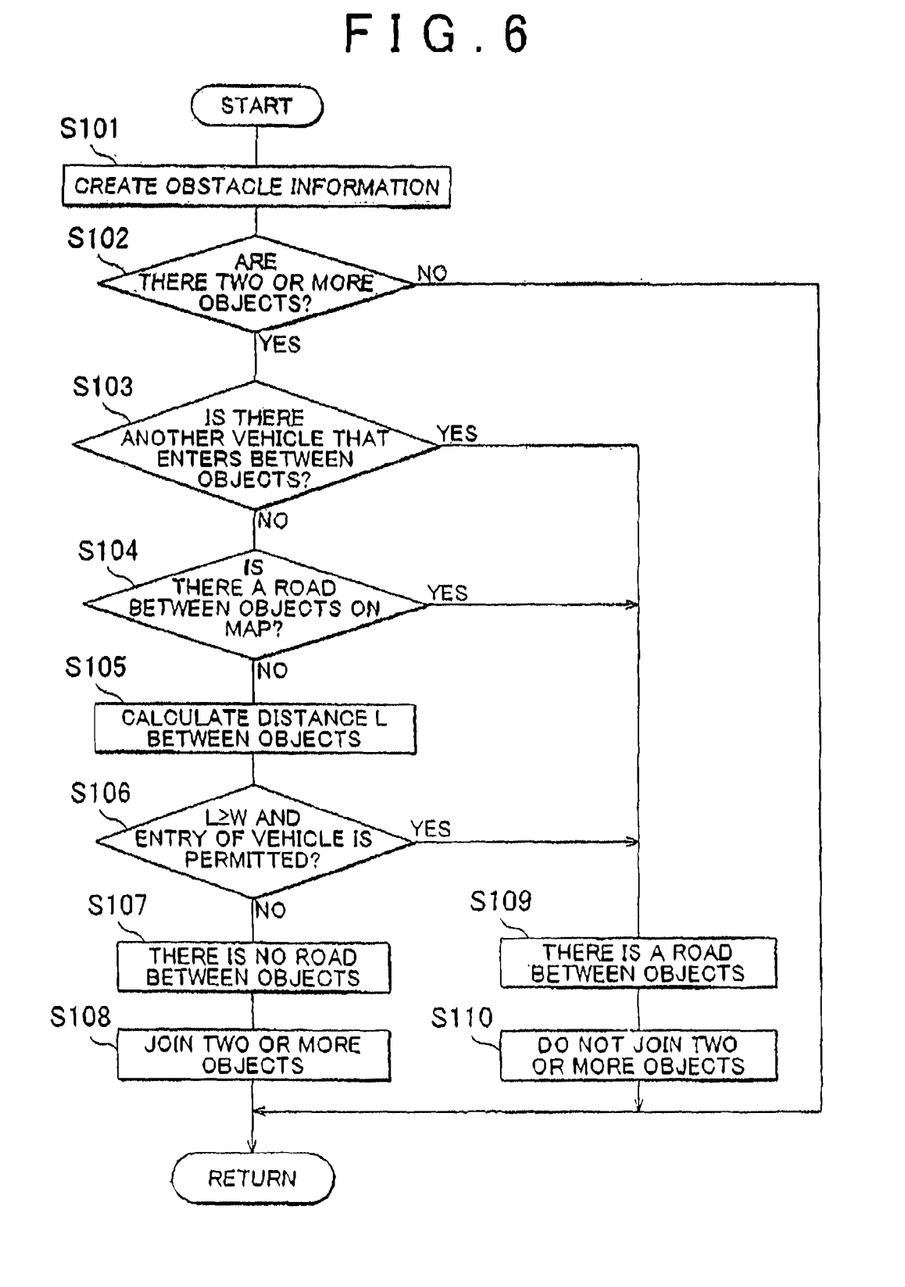
FIG. 6 is a flowchart illustrating a routine executed when an ECU performs a grouping operation.

In the following, a procedure of executing a grouping process according to this embodiment of the invention will be described with reference to FIG. 6. FIG. 6 illustrates a routine which is periodically executed by the ECU 1, and is stored in advance in the ROM of the ECU 1.

In the routine of FIG. 6, the ECU 1 initially creates obstacle information from the output signal of the radar device 2 in step S101. Namely, the ECU 1 functions as the above-indicated obstacle information processing unit 100. Thus, execution of step S101 by the ECU 1 provides the detecting means according to the invention.

In step S102, the ECU 1 determines whether two or more objects are discontinuously located or arranged in a direction parallel to the lane, based on the obstacle information created in the above step S101. If a negative decision (NO) is obtained in step S102, the ECU 1 once finishes execution of this routine. If, on the other hand, an affirmative decision (YES) is obtained in step S102, the ECU 1 proceeds to step S103.

In step S103, the ECU 1 determines whether the trace of another vehicle extends through between the two or more objects. Namely, the ECU 1 specifies the traces of other vehicles that are running in the vicinity of the self vehicle, and determines whether there is a trace of any vehicle that enters space between the objects, among the specified traces. If a negative decision (NO) is obtained in step S103, the ECU 1 proceeds to step S104.

In step S104, the ECU 1 determines whether a road is registered between the objects in map information possessed by the navigation system. If a negative decision (NO) is obtained in step S104, the ECU 1 proceeds to step S105.

In step S105, the ECU 1 computes the distance (width) L between the objects, using the obstacle information (the coordinates representing the positions of respective objects on a coordinate system in which the self vehicle lies on the origin) created in the above step S101.

In step S106, the ECU 1 determines whether the distance L between the objects, which is calculated in the above step S105, is equal to or larger than the width W of a road (which will be called "vehicle passable road") through which the vehicle can pass. It is desirable that, in step S106, the ECU 1 determines whether there is a road sign or road marker indicative of no-entry of vehicles, in addition to determining whether the distance L between the objects is equal to or larger than the width W of the vehicle passable road. In this case, the ECU 1 makes an affirmative decision (YES) if the distance L between the objects is equal to or larger than the width W of the vehicle passable road, and there is no road sign or marker indicative of no-entry of vehicles, and makes a negative decision (NO) if the distance L between the objects is smaller than the width W of the vehicle passable road, or there is a road sign or marker indicative of no-entry of vehicles.

If a negative decision (NO) is obtained in the above step S106, the ECU 1 proceeds to step S107, and determines that there is no vehicle passable road between the objects. Then, the ECU 1 proceeds to step S108, and regards (groups) the two or more objects as a single object. Namely, the ECU 1 determines the running course of the vehicle, while regarding the two or more objects as a single object.

If an affirmative decision (YES) is obtained in the above step S103, S104 or S106, the ECU 1 proceeds to step S109 to determine that a road which the vehicle can enter is present between the objects. Then, the ECU 1 proceeds to step S110, and does not regard (group) the two or more objects as a single object. Namely, the ECU 1 treats the two or more objects as individually independent objects, and determines the course based on roads including the road located between the two or more objects.

Thus, execution of step S104 through step S106 by the ECU 1 provides the determining means according to the invention. Also, execution of step S107 through step S110 by the ECU 1 provides the course determining means according to the invention.

According to the embodiment as described above, when there is a road which the vehicle can enter, between two or more objects, it is possible to avoid a situation where the two or more objects are regarded (grouped) as a single object, and also avoid a situation where the road located between the two or more objects is treated as a region that deviates from the course. As a result, it is possible to avoid a situation where the driving assisting process is unnecessarily executed when the driver is going to cause the vehicle to enter the road between the objects. Thus, it is possible to determine a running course suitable for the actual road conditions.

The invention claimed is:

1. A course determining system of a vehicle for determining a running course as a path along which the vehicle travels, comprising:

detecting means for detecting a plurality of objects that are present around the vehicle;

determining means for determining whether a passable road on which the vehicle can enter is present between the plurality of the objects when the plurality of objects are detected by the detecting means such that:

when it is determined that there is no road on which the vehicle can enter between the plurality of objects, the plurality of objects is determined as a single object;

when it is determined that a road on which the vehicle can enter is present between the plurality of objects, the plurality of objects is not determined as a single object;

when the vehicle proceeds between the plurality of objects and it is determined that no road which the vehicle can enter is present between the plurality of objects, a driving assisting process is carried out;

when the vehicle proceeds between the plurality of objects and the determining means determines that a road on which the vehicle can enter is present between the plurality of objects, the driving assisting process is not carried out; and when it is determined that a road is present between the plurality of the objects, the determining means determines that there is no passable road between the objects when the road is a no-entry road which the vehicle is inhibited from entering; and course determining means for determining the running course based on at least one road including the passable road between the objects such that when it is determined that a road on which the vehicle can enter is present between the plurality of objects, the running course of the vehicle is determined based on roads including the passable road located between the plurality of objects.

2. The course determining system according to claim 1, wherein the determining means determines that the passable road is present between the plurality of the objects, when a distance between the objects is larger than a width of a road through which the vehicle can pass.

3. The course determining system according to claim 1, wherein the determining means determines that the passable road is present between the plurality of the objects, when the road located between the objects is registered in map information of a navigation system.

4. The course determining system according to claim 1, wherein the determining means specifies a trace of another vehicle, and determines that the passable road is present between the plurality of the objects when the specified trace extends through between said plurality of the objects.

5. A vehicle driving assist system, comprising:

detecting means for detecting a plurality of objects that are present around the vehicle;

determining means for determining whether a passable road on which the vehicle can enter is present between the plurality of the objects when the plurality of objects are detected by the detecting means such that:
  when it is determined that there is no road on which the vehicle can enter between the plurality of objects, the plurality of objects is determined as a single object;
  when it is determined that a road on which the vehicle can enter is present between the plurality of objects, the plurality of objects is not determined as a single object;
  when the vehicle proceeds between the plurality of objects and it is determined that no road on which the vehicle can enter is present between the plurality of objects, a driving assisting process is carried out;
  when the vehicle proceeds between the plurality of objects and the determining means determines that a road on which the vehicle can enter is present between the plurality of objects, the driving assisting process is not carried out; and
  when it is determined that a road is present between the plurality of the objects, the determining means determines that there is no passable road between the objects when the road is a no-entry road which the vehicle is inhibited from entering; and
control means for executing a driving assisting process, such that:
  when it is determined that no passable road is present between the objects, the driving assistance process is executed in response to the motion of the vehicle that is about to pass through between the plurality of the objects; and
  when it is determined that a passable road is present between the objects, the execution of the driving assistance process is restricted in response to the motion of the vehicle that is about to pass through between the plurality of the objects.

6. A course determining system of a vehicle for determining a running course as a path along which the vehicle travels, comprising:
  a detector that is configured to detect at least one object in a plurality of objects that is present around the vehicle; and
  a controller configured to determine whether a passable road on which the vehicle can enter is present between the plurality of the objects when the plurality of the objects is detected by the detector, and determine the running course based on at least one road including the passable road between the objects such that:
    when it is determined that there is no road on which the vehicle can enter between the plurality of objects, the plurality of objects is determined as a single object;
    when it is determined that a road on which the vehicle can enter is present between the plurality of objects, the plurality of objects is not determined as a single object and the running course of the vehicle is determined based on roads including the passable road located between the plurality of objects;
    when the vehicle proceeds between the plurality of objects and it is determined that no road which the vehicle can enter is present between the plurality of objects, a driving assisting process is carried out;
    when the vehicle proceeds between the plurality of objects and the determining means determines that a road which the vehicle can enter is present between the plurality of objects, the driving assisting process is not carried out; and
    when it is determined that a road is present between the plurality of the objects, the controller determines that there is no passable road between the objects when the road is a no-entry road which the vehicle is inhibited from entering.

7. The course determining system according to claim 6, wherein the controller is configured to determine that the passable road is present between the plurality of the objects, when a distance between the objects is larger than a width of a road through which the vehicle can pass.

8. The course determining system according to claim 6, wherein the controller is configured to determine that the passable road is present between the plurality of the objects, when the road located between the objects is registered in map information of a navigation system.

9. The course determining system according to claim 6, wherein the controller is configured to specify a trace of another vehicle, and determine that the passable road is present between the plurality of the objects when the specified trace extends through between the plurality of the objects.

10. A vehicle driving assist system, comprising:
  a detector configured to detect at least one object in a plurality of objects that is present around the vehicle; and
  a controller configured to:
    determine whether a passable road on which the vehicle can enter is present between the plurality of the objects when the plurality of the objects are detected by the detector, and the controller being configured to execute a driving assisting process,
    determine the plurality of objects as a single object, if it is determined that there is no road on which the vehicle can enter between the plurality of objects,
    not determine the plurality of objects as a single object and to determine the running course of the vehicle based on roads including the passable road located between the plurality of objects, if it is determined that a road on which the vehicle can enter is present between the plurality of objects,
    determines that there is no passable road between the objects when the road is a no-entry road which the vehicle is inhibited from entering, when it is determined that a road is present between the plurality of the objects, and
    execute the driving assisting process in response to the motion of the vehicle that is about to pass through between the plurality of the objects when it is determined that there is no passable road between the objects, and restrict execution of the driving assisting process responsive to the motion of the vehicle that is about to pass through between the plurality of the objects when it is determined that the passable road is present between the plurality of objects.

* * * * *